Sept. 5, 1950     T. ZIMMERMAN     2,521,275
WORK CHUCK
Filed Jan. 17, 1945     2 Sheets-Sheet 1
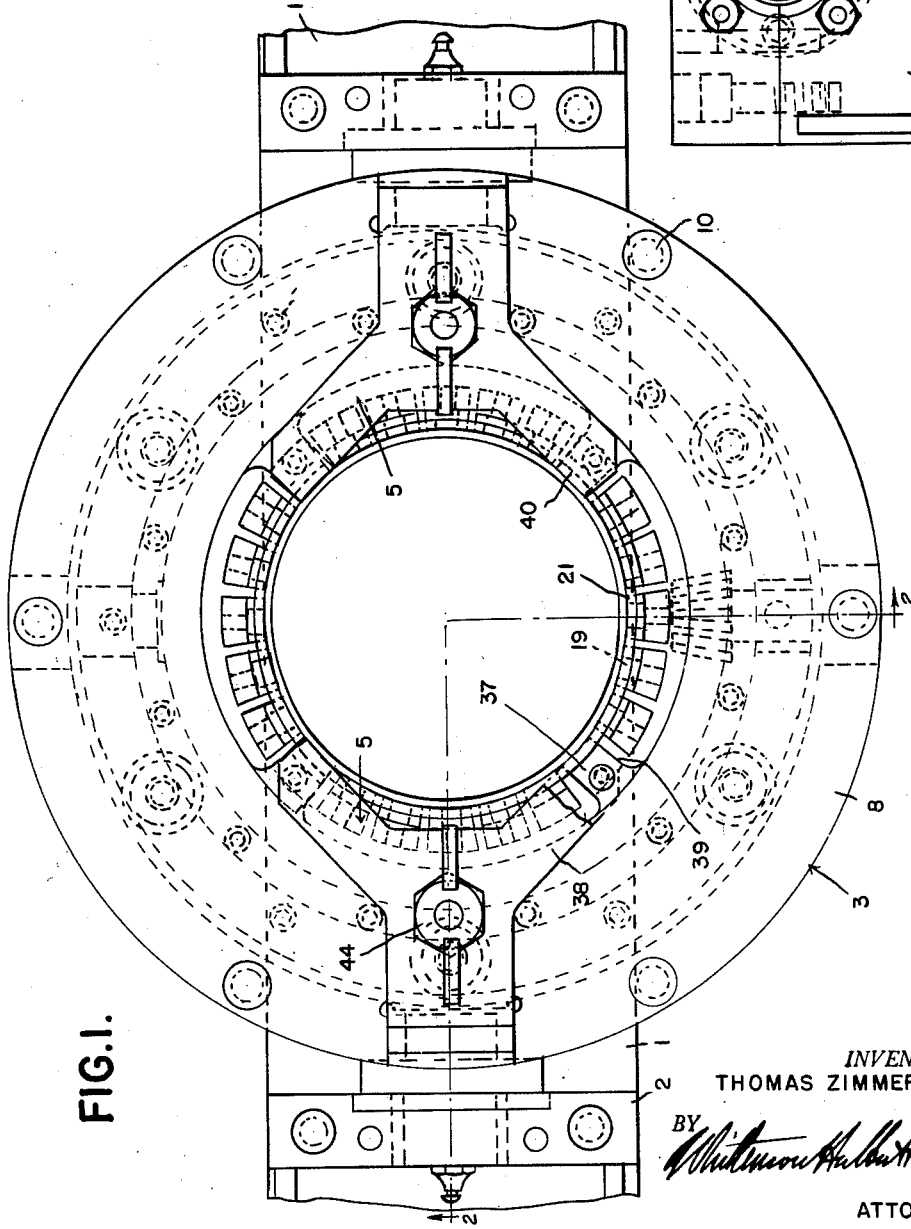
INVENTOR.
THOMAS ZIMMERMAN
BY
ATTORNEYS Sept. 5, 1950 T. ZIMMERMAN 2,521,275
WORK CHUCK
Filed Jan. 17, 1945 2 Sheets-Sheet 2
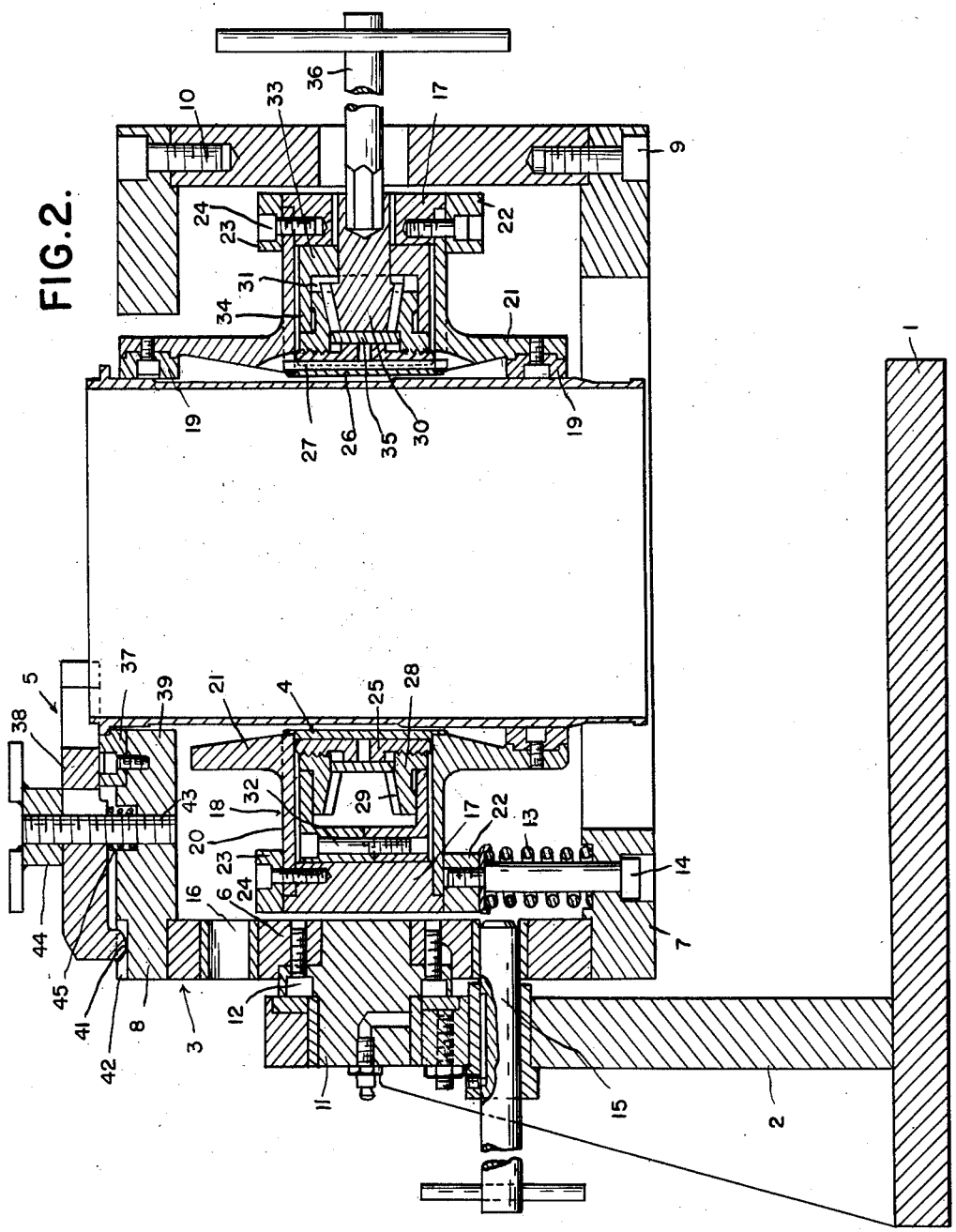
INVENTOR.
THOMAS ZIMMERMAN
ATTORNEYS Patented Sept. 5, 1950

2,521,275

UNITED STATES PATENT OFFICE 2,521,275

WORK CHUCK

Thomas Zimmerman, Grosse Pointe Farms, Mich., assignor to Kelsey-Hayes Wheel Company, Detroit, Mich., a corporation of Delaware Application January 17, 1945, Serial No. 573,211

9 Claims. (Cl. 279—117)

The invention relates to work chucks and refers more particularly to chucks for holding tubular work.

The invention has for one object to provide an improved chuck which is constructed to hold tubular work accurately in position and in accurate cylindrical condition.

The invention has for another object to provide a chuck comprising two units which are yieldably supported with respect to each other, one unit being engageable with the work to center the same and the other unit being engageable with the work to longitudinally position the same.

The invention has for a further object to provide a chuck having a unit formed of diaphragms which are spaced from each other and also having means between the diaphragms for flexing the same.

These and other objects of the invention reside in the novel features of construction and combinations and arrangements of parts as more fully hereinafter set forth.

In the drawings:

Figure 1 is a top plan view of a work chuck embodying the invention;

Figure 2 is a cross section on the line 2—2 of Figure 1;

Figure 3 is a side elevation of a portion of Figure 1.

The work chuck embodying the invention may be used to hold tubular work of various cross sections while various types of operations are being performed on the work. More particularly, the work chuck is designed to hold cylindrical work, such as a cylinder sleeve, a bushing, or a bearing, while the internal surface of the cylindrical work is being operated upon. Specifically, the cylindrical work is a relatively thin-walled cylinder sleeve provided at one end with an external annular flange.

The work chuck, as illustrated, comprises the base 1, the uprights 2 on the base, the carrier 3 located between and mounted on the uprights, and the clamping units 4 and 5 on the carrier. The unit 4 externally engages the sleeve to accurately center the same and the unit 5 engages the opposite sides of the annular flange of the sleeve to longitudinally position the sleeve.

The carrier 3 comprises the annular member 6 and the annular plates 7 and 8 secured to opposite ends of the annular member and extending radially inwardly therefrom. Suitable means, such as the bolts 9 and 10, secure the annular plates to the annular member. The annular member 6 is journaled on the uprights by means of the gudgeons 11 which are fixedly secured to the annular member 6 by suitable means, such as the bolts 12. The carrier also comprises the coil springs 13 which extend between the annular plate 7 and the clamping unit 4 and yieldably support the latter on the former. 14 are bolts extending through the annular plate 7 and encircled by the coil springs and threaded into the clamping unit 4 for limiting the movement of the clamping unit away from the annular plate. The carrier may be swung relative to the uprights through an angle of 180 degrees and may be locked in either position by means of the plunger 15 which extends through one of the uprights and into one of the holes 16 formed in the annular member 6.

The unit 4 comprises the annular member 17, the diaphragms 18 on the annular member, the annular series of clamping jaws 19 on the diaphragms, and actuating means between the diaphragms for flexing the same to move the jaws. The diaphragms 18 are spaced longitudinally of the annular member 17 and comprise the resilient disc portions 20 which extend generally radially inwardly from the annular member and the axially extending arm portions 21 which extend away from each other and have secured thereto the jaws 19 which face generally radially inwardly. The disc portions 20 are secured to the annular member by means of the annular members 22 and 23 which are secured to the annular member 15 by suitable means, such as the bolts 24. The lower annular member 22 is threadedly engaged by the bolts 14.

The means for flexing the diaphragms 18 to move the jaws 19 generally radially outwardly to released position comprises the aligned externally threaded actuating members 25 which have rounded ends engaging the disc portions 20 of the diaphragms at their radially inner ends. The actuating members are held from rotation relative to the diaphragms by the annular closure member 26 extending between the diaphragms at their radially inner ends and the key 27 between the closure member and the actuating members and extending into the diaphragms. 28 are internally threaded members threadedly engaging the actuating members 25 and formed with the rack teeth 29 which are opposed to each other. These rack teeth are engageable by the teeth of the revoluble pinion 30 which is journaled in the base of the U-shaped annular member 31. The member 31 is formed of two L-shaped rings fixedly secured together by the bolts 32 extending within the axially aligned flanges 33 of the rings which form the base. The member is located between the diaphragms and its base lies against the annular member 17. The radial flanges 34 of the L-shaped rings encircle the threaded portions of the internally threaded members 28 and also overlie the portions of the internally threaded members 28 having the rack teeth to thereby guide the internally threaded members, both radially and axially. 35 is an annular spacer between the internally threaded members radially inwardly of the pinion 30.

36 is a wrench insertable through an opening in the annular member 6 into a suitable polygonal socket in the pinion 30 to revolve the latter.

The construction is such that by revolving the pinion 30 in the proper direction the internally threaded members 28 will be rotated in opposite directions to move the externally threaded actuating members 25 axially of the cylinder sleeve and away from each other to thereby flex the disc portions 20 of the diaphragms and move the clamping jaws 19 on the diaphragms generally radially outwardly to released position. On the other hand, by turning the pinion 30 in the opposite direction the diaphragms will be released and their arms and the jaws will be free to move generally radially inwardly under the inherent resiliency in the disc portions of the diaphragms. The jaws exert a predetermined pressure on the cylinder sleeve sufficient to firmly grip and hold the sleeve from rotation while its internal surface is being operated upon. Furthermore, the jaws exert the same pressure on the sleeve which is sufficient to overcome the resistance offered by the relatively thin wall of the sleeve to thereby compel the sleeve to be truly cylindrical.

The clamping unit 5 is mounted on the annular plate 8 and comprises the diametrically opposite pairs of jaws 37 and the cooperating diametrically opposite jaw members 38. The jaws 37 are equally spaced from each other and are mounted on the extensions 39 of the annular plate 8, the arms 21 being cut away to receive the extensions 39 and jaws 37 which, it will be noted, clear the external surface of the cylinder sleeve. The jaws 37 are, however, formed with rabbets to receive the external annular flange of the sleeve which has one side wall resting on the jaws 37. The jaw members 38 are bifurcated and have at the ends of their furcations the jaws 40 which are located axially opposite the jaws 37 and engage the side of the external annular flange of the sleeve opposite the side engaged by the jaws 37. As a result, the jaws 37 and 40 cooperate to effectively longitudinally position the sleeve. It will also be noted that the jaws 37 are positioned so that their rabbets are engageable with the external surface of the annular flange of the sleeve to approximately center the same. The jaw members 38 are provided at the ends remote from the furcations with the transverse projections 41 which are adapted to fulcrum upon the bottoms of the grooves 42 formed in the annular plate 8. 43 is a screw threaded into the annular plate 8 and having a head 44 abutting a jaw member 38 intermediate its ends for moving the same to clamping position. 45 is a coil spring encircling each of the screws 43 and located in a recess in the annular plate 8 and abutting the side of the adjacent jaw member 38 to resiliently move the same to released position when the associated screw is rotated to released position.

From the above description it will be seen that I have provided a simple construction of work chuck having spaced diaphragms with clamping jaws thereon and provided with means between the diaphragms for moving the same to released position. It will also be seen that I have provided a simple construction of work chuck having two clamping units, one of which is adapted to center the work and the other of which is adapted to longitudinally position the work. Further, that the clamping units are mounted on a carrier so that one unit is yieldably mounted with respect to the other.

What I claim as my invention is:

1. A work chuck comprising an annular member, flexible diaphragms on and spaced longitudinally of said annular member, an annular series of clamping jaws on each of said diaphragms, and means between said diaphragms for flexing the same to move said jaws.

2. A work chuck comprising an annular member, diaphragms spaced longitudinally of and extending generally radially inwardly from said annular member, an annular series of generally radially inwardly facing clamping jaws on each of said diaphragms, actuating members between and engageable with the radially inner end portions of said diaphragms, and means for simultaneously moving said actuating members to flex said diaphragms to thereby move said jaws.

3. A work chuck comprising an annular member, diaphragms spaced longitudinally of and extending generally radially inwardly from said annular member, an annular series of generally radially inwardly facing clamping jaws on each of said diaphragms, threaded actuating members between and engageable with the radially inner end portions of said diaphragms, rotatable members having threaded engagement with said actuating members, and means for rotating said rotatable members.

4. A work chuck comprising an annular member, diaphragms on said annular member, an annular series of clamping jaws on each of said diaphragms, and means between said diaphragms for flexing the same to move said jaws, said means comprising threaded actuating members between and engageable with said diaphragms, rotatable members having threaded engagement with said actuating members, and a revoluble member engageable with said rotatable members for rotating the same in opposite directions.

5. A work chuck comprising an annular member, diaphragms spaced longitudinally of and extending generally radially inwardly from said annular member, an annular series of generally radially inwardly facing clamping jaws on each of said diaphragms, externally threaded actuating members between and engageable with the radially inner end portions of said diaphragms, means for holding said actuating members from rotation relative to said diaphragms, internally threaded rotatable members engageable with said actuating members, said rotatable members being provided with opposed teeth, and a revoluble gear member engageable with said teeth to rotate said rotatable members.

6. A work chuck comprising an annular member, flexible diaphragms on and spaced longitudinally of said annular member and extending transversely of the axis thereof, substantially axially aligned annular series of clamping jaws on said diaphragms and means acting on said diaphragms for flexing the same to move said jaws.

7. A work chuck comprising an annular member, flexible diaphragms on and spaced longitudinally of said annular member and extending transversely of the axis thereof, generally axially extending and generally radially facing jaws on said diaphragms and means acting on said diaphragms for flexing the same to move said jaws.

8. A work chuck comprising an annular member, flexible diaphragms secured to opposite ends of said annular member and extending transversely of the axis thereof, jaws on said diaphragms extending generally axially and away from each other and facing generally radially, and means between said diaphragms and acting thereon to flex the same to move said jaws.

9. A work chuck comprising an annular member, diaphragms spaced longitudinally of and extending generally radially of said annular member, generally radially facing clamping jaws on each of said diaphragms and means for moving longitudinally of said annular member the portions of said diaphragms on which said jaws are mounted to move said jaws.

THOMAS ZIMMERMAN.

REFERENCES CITED

The following references are of record in the file of this patent:

UNITED STATES PATENTS

| Number | Name | Date |
|---|---|---|
| 1,681,070 | Uschmann | Aug. 14, 1928 |
| 1,938,356 | Searles | Dec. 5, 1933 |
| 1,956,318 | Draper | Apr. 24, 1934 |